United States Patent
Fey et al.

(10) Patent No.: US 9,529,681 B2
(45) Date of Patent: Dec. 27, 2016

(54) MICROPROCESSOR SYSTEM FOR CONTROLLING OR REGULATING AT LEAST PARTLY SAFETY-CRITICAL PROCESSES

(75) Inventors: Wolfgang Fey, Niedernhausen (DE); Andreas Kirschbaum, Darmstadt (DE); Adrian Traskov, Steinbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 1121 days.

(21) Appl. No.: 12/063,458

(22) PCT Filed: Aug. 2, 2006

(86) PCT No.: PCT/EP2006/064976
§ 371 (c)(1),
(2), (4) Date: May 21, 2010

(87) PCT Pub. No.: WO2007/017444
PCT Pub. Date: Feb. 15, 2007

(65) Prior Publication Data
US 2010/0235680 A1      Sep. 16, 2010

(30) Foreign Application Priority Data

Aug. 11, 2005  (DE) .................. 10 2005 038 306
Aug. 2, 2006   (DE) .................. 10 2006 036 384

(51) Int. Cl.
G06F 11/00   (2006.01)
G06F 11/16   (2006.01)
G06F 11/10   (2006.01)

(52) U.S. Cl.
CPC ....... *G06F 11/1641* (2013.01); *G06F 11/1048* (2013.01)

(58) Field of Classification Search
CPC .............. G06F 11/1048; G06F 11/1633; G06F 11/1641; G06F 11/1679; G06F 11/263; G06F 11/2635; G05B 19/0425; G05B 19/0428
See application file for complete search history.

(56) References Cited

U.S. PATENT DOCUMENTS 4,901,320 A * 2/1990 Sawada et al. .................. 714/15
4,926,426 A * 5/1990 Scheuneman et al. ....... 714/772
(Continued)

FOREIGN PATENT DOCUMENTS

EP        0306348        3/1989

*Primary Examiner* — Marc Duncan

(57) ABSTRACT

A microprocessor system (50) for controlling or regulating at least partly safety-critical processes, comprising two central processing units (1, 2) integrated in a chip housing, a first and a second bus system, at least one full memory (7) on the first bus system, at least one test data store (51) on the second bus system, which has a reduced store coverage compared to the full memory on the first bus system and in which test data are stored which are connected to data of the memory (7) on the first bus system, and the bus systems comprise comparison and/or driver components which allow the data interchange and/or comparison of data between the two bus systems, and a hardware test data generator (4) is arranged at least on the second bus system, in which case at least part of the full memory on the first bus is additionally backed up using another test data store (5) and test data on the first bus. The invention further relates to the use of the above microprocessor system in motor vehicle controllers.

8 Claims, 1 Drawing Sheet

(56) References Cited

U.S. PATENT DOCUMENTS

| | | | | |
|---|---|---|---|---|
| 5,764,660 | A * | 6/1998 | Mohat | G06F 11/1641 |
| | | | | 714/10 |
| 5,862,502 | A * | 1/1999 | Giers | B60T 8/885 |
| | | | | 303/122 |
| 5,909,541 | A | 6/1999 | Sampson et al. | |
| 6,201,997 | B1 | 3/2001 | Giers | |
| 6,275,752 | B1 * | 8/2001 | Giers | F02D 41/266 |
| | | | | 701/33.7 |
| 6,393,582 | B1 * | 5/2002 | Klecka | G06F 11/1441 |
| | | | | 714/10 |
| 6,502,019 | B1 * | 12/2002 | Zydek | G05B 19/0428 |
| | | | | 174/6 |
| 6,694,449 | B2 * | 2/2004 | Ghameshlu | G06F 11/1633 |
| | | | | 714/11 |
| 6,823,251 | B1 * | 11/2004 | Giers | B60G 17/0185 |
| | | | | 303/122 |
| 2006/0161918 | A1 * | 7/2006 | Giers | G06F 11/1641 |
| | | | | 718/102 |
| 2010/0185927 | A1 * | 7/2010 | Fey | G06F 11/1048 |
| | | | | 714/819 |

* cited by examiner

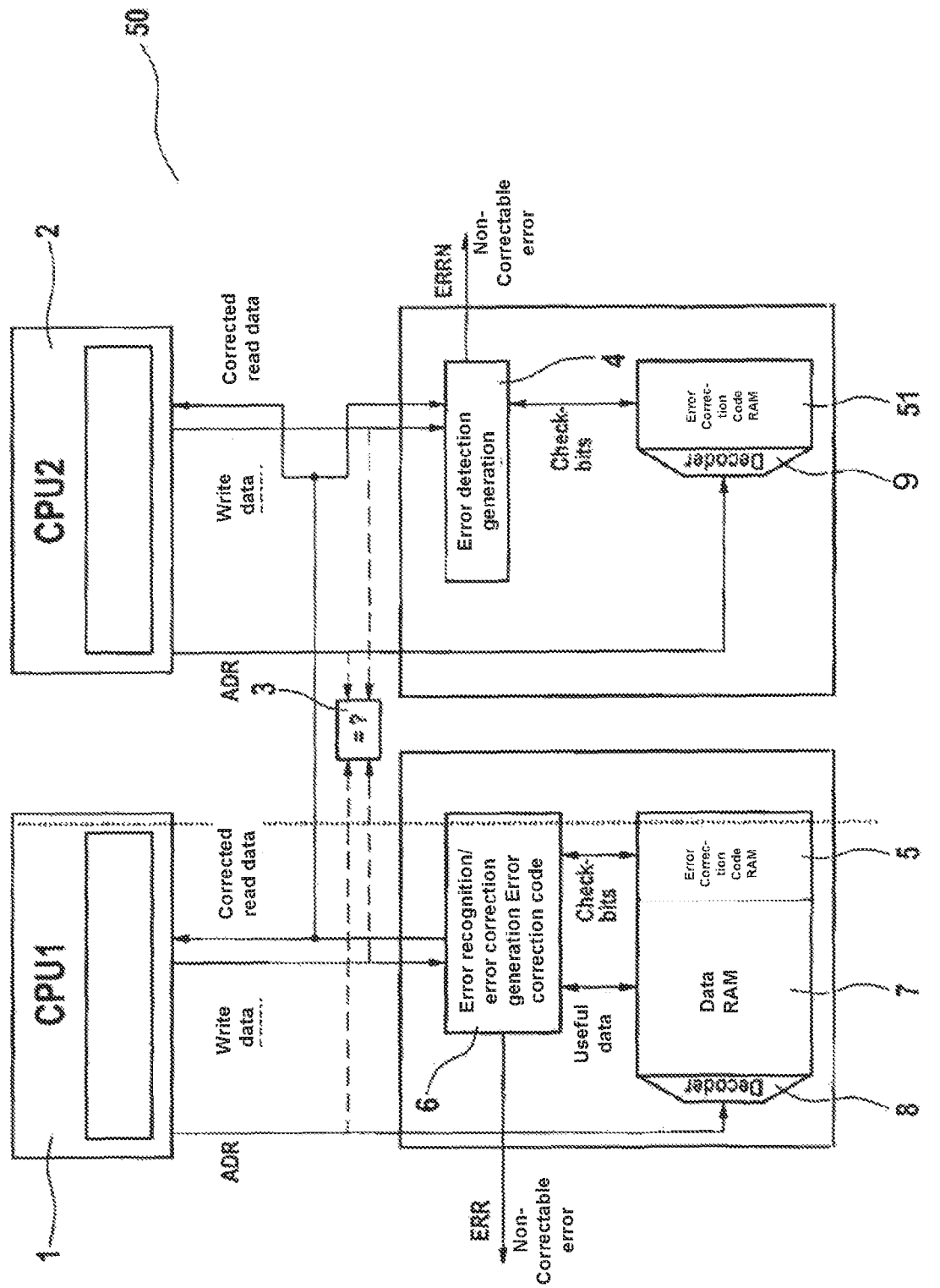

MICROPROCESSOR SYSTEM FOR CONTROLLING OR REGULATING AT LEAST PARTLY SAFETY-CRITICAL PROCESSES

BACKGROUND OF THE INVENTION

The invention relates to a microprocessor system for controlling or regulating at least partly safety-critical processes, comprising two central processing units (1, 2) integrated in a chip housing, a first and a second bus system, at least one full memory (7) on the first bus system, at least one test data store (51) on the second bus system, which has a reduced store coverage compared to the full memory on the first bus system and in which test data are stored which are connected to data of the memory (7) on the first bus system, and the bus systems comprise comparison and/or driver components which allow the data interchange and/or comparison of data between the two bus systems, and a hardware test data generator (4) is arranged at least on the second bus system. At least part of the full memory on the first bus is additionally backed up by means of another test data store (5) and test data on the first bus. The invention also relates to the microprocessor systems use in motor vehicle controllers.

DE 195 29 434 A1 (P 7959) discloses a microprocessor system for safety-critical applications for controlling or regulating at least partly safety-critical processes, comprising two central processing units (1, 2) integrated in a chip housing, a first and a second bus system, at least one full memory (7) on the first bus system, at least one test data store (51) on the second bus system, which has a reduced store coverage compared to the full memory on the first bus system and in which test data are stored which are connected to data of the memory (7) on the first bus system, and the bus systems comprise comparison and/or driver components which allow the data interchange and/or comparison of data between the two bus systems, and a hardware test data generator (4) is arranged at least on the second bus system. For reasons of redundancy, this microprocessor system contains two homogeneous microprocessor cores (core redundancy) which execute the same program in clock synchronism and in parallel. The bus systems associated with the microprocessor systems are likewise provided in duplicate, but the memory is not of fully symmetrical design, for reasons of cost. It has been found that a high error recognition rate can be achieved if one of the two bus systems stores only test data in a test data store with relatively low storage capacity, said test data being explicitly associated with the full data in the full memory. So that both cores each have all the data available in redundant form, the full data are continually compared with the test data using hardware generators. The hardware generators can either generate test data or can complement the test data for comparison using the full data (data error correction).

It is an aim of the present invention to specify an alternative two-core microprocessor system which likewise comprises a full memory and a test data store of relatively small size for storing redundancy information which is associated with the original data stored in the full memory, and where the microprocessor system has an increased error recognition rate in comparison with corresponding two-core microprocessor systems.

SUMMARY OF THE INVENTION

The invention achieves this object by means of the microprocessor system for controlling or regulating at least partly safety-critical processes, comprising two central processing units (1, 2) integrated in a chip housing, a first and a second bus system, at least one full memory (7) on the first bus system, at least one test data store (51) on the second bus system, which has a reduced store coverage compared to the full memory on the first bus system and in which test data are stored which are connected to data of the memory (7) on the first bus system, and the bus systems comprise comparison and/or driver components which allow the data interchange and/or comparison of data between the two bus systems, and a hardware test data generator (4) is arranged at least on the second bus system. The at least part of the full memory on the first bus is additionally backed up by means of another test data store (5) and test data on the first bus.

The microprocessor system based on the invention comprises two central processing units integrated in a chip housing.

Each processing unit has an associated dedicated bus system (first and second bus), which means that this bus system is likewise of redundant design.

At least one full memory is arranged on the first bus. At least one test data store is provided on the second bus which has a reduced storage capacity in comparison with the full memory in the first bus system.

The test data store in the second bus is used to store test data which are connected to data in the full memory. Storing the test data serves to identify typical data store errors, which can arise in rare cases during read or write operations. Such errors can also be recognized by virtue of the full memory being provided in duplicate and the data being stored twice in identical form. This is cost-intensive, however, since the memory makes up a considerable portion of a chip's manufacturing costs. It has been found that in line with the microprocessor system based on the present invention it is also possible to effect adequate error recognition using a redundancy memory having a reduced memory space requirement, the test data store. To this end, by way of example, a data word (data item) in the full memory has a test information item or a test value (e.g. parity information, Hamming code or the like) stored for it in the test data store. In the simplest case, this may be a parity bit having a length of 1 bit. More complex encoding methods, e.g. Hamming codes, can also allow error correction and recognize multiple errors. The parity information item may be formed on a word-by-word basis and/or in combination from a plurality of data words in the full memory (blockwise test data encoding).

Preferably, only part of the full memory is backed up by a test data store. In this case, there are therefore memory areas in the full memory which are not backed up against errors. These memory areas can be filled with less important program functions which are not safety-critical. However, it is also possible for the whole full memory to be backed up by the test data store on the second bus.

In addition, the bus systems comprise comparison and/or driver components which allow the data interchange and/or comparison of data between the two bus systems.

At least the second bus system has an inherently known hardware test data generator arranged on it which is produced by logic gates, for example. The test information required for recognizing memory errors is consequently not generated by a central processing unit (CPU) but rather by what is known as a hardware test data generator arranged physically separately from the CPU. A hardware test data generator is preferably an essentially hardwired semiconductor structure which takes a prescribed logic as a basis for performing particular work steps for data processing and/or signal processing independently without the aid of a central processing unit. Although the operations performed by the hardware generator could in principle also be performed by the central processing unit, this is usually associated—besides with a possible increased error rate—with a higher clock cycle consumption, which would greatly increase the delay time.

The full memory is preferably a read/write memory. However, it is also possible for a read-only memory (e.g. ROM, Otp ROM, EPROM, EEPROM or Flash ROM) to be backed up on the basis of the inventive principle.

Although the method of backup using a test data store which is known from DE 195 29 434 A1 meets the availability demands which are required for today's applications, there are, besides the memory errors mentioned, also additional types of error which the known architecture cannot safeguard against. By way of example, it is not possible to recognize errors on the address bus and errors in the address decoder. Although blockwise test data encoding for generating test information would allow these additional types of error to be recognized, this method would be limited to the application of a read-only memory. Therefore, in line with the invention, at least part of the full memory on the first bus is backed up using an additional test data store, likewise arranged on the first bus, and appropriate test data. This achieves recognition of the aforementioned additional types of error.

Preferably, the microprocessor system based on the invention has a device for address error recognition implemented in it. This is designed, in particular, such that means are provided which include the address of the data to be backed up in the calculation of the test data. With quite particular preference, writing involves particularly the test data, which are check bits, for example, being calculated not only using the data bits but also using the data to be backed up and the associated address. In this way, addressing errors can be recognized when the data are read. The address error recognition is preferably provided on each of the two bus systems.

An alternatively preferred means for address error recognition comprises a device which is additionally implemented in a microprocessor system and which performs one or more tests for address error recognition in the background. This type of error recognition is expediently not performed in parallel during read/write access operations. Instead, this error recognition measure is taken particularly only within the context of a periodic separate check in which there are preferably no further fundamental CPU activities. The alternative address error recognition described here may be in the form of software or in the form of a hardware measure. The means described here may be in the form of a type of built-in self test, particularly within the CPU or within the hardware state machine.

In line with the self test, the memory preferably has a predefined pattern written to it and then read from it. The pattern may particularly preferably be in a form such that possible decoding errors or actuation errors intentionally result in corruption of the data. During reading, this intentionally caused error is then recognized.

In addition or as an alternative to the two aforementioned error recognition devices, an addressing error recognition means is preferably implemented in which a memory cell has the address of the memory cell written to it and then checked.

An example of the previously described method is what is known as the "Address-to-Data" test. This test involves each memory location having the numerical value of the address of the memory location written to it:

| Address | Data item |
|---------|-----------|
| 0x00    | 0x00      |
| 0x01    | 0x01      |
| ...     |           |
| 0xff    | 0xff      |

In the event of an error, one number is then not read back and another is doubled instead.

The test data store used in line with the invention is in principle a conventional read/write memory, but with a reduced storage capacity in comparison with the full memory.

The microprocessor systems are integrated in a common chip housing and are preferably operated in clock synchronism. Preferably, both systems are arranged on a common semiconductor material.

The microprocessor system comprises two bus systems which preferably each comprise a data bus, an address bus and a control bus.

In addition to the read/write memory or memories, there is naturally also at least one read-only memory for operating the microprocessor system. The term read-only memory is understood, in line with the invention, to mean a memory which is nonvolatile at least for a certain time, such as particularly of the ROM, Flash ROM or OTP ROM type. In line with the principle of core redundancy, it is then not absolutely necessary for both bus systems to have full or identical-content read-only memories on them. If the redundancy concept is also transferred to the read-only memory, which is preferred, then provision is made for appropriate test information to ensure that the data in the read-only memory are backed up. This can be achieved particularly by a smaller read-only memory on the second bus which contains suitable test information instead of the data.

Preferably, the microprocessor system based on the invention is used to store test data additionally on the first bus in the physical memory or at least in direct proximity to the full read/write memory. In direct proximity means that the relevant chip structures adjoin one another, which means that it is possible to observe the necessary short delay time for the data.

The microprocessor system is preferably designed such that a read cycle involves the data in the full memory being compared with test data associated with these data by one or more hardware test units which is/are positioned particularly in or in proximity to the data memory area. The hardware correction unit(s) correct(s) the data in the case of an error using the test data. By way of example, this correction allows simple errors, such as an incorrect bit, to be readily corrected, so that the microprocessor system does not need to be switched off. Depending on the complexity of the test word, it is thus also possible to intercept more complicated errors. If correction is not successful, that is to say if the error in the data was so complex that logic combination with the test information causes the corrected data still to be erroneous, then these data are spotted by a preferably present further comparison unit which compares the data queuing on the parallel bus systems. Consequently, an error signal is expediently output on a suitable error line which, in particular, shuts down the microprocessor system or decouples it from the rest of the electronics. In an electronic braking system, for example, this effectively prevents the valve drivers from being actuated by mistake.

In contrast to known error-correcting/error-recognizing microprocessors, which use the principle of core redundancy and which contained only mechanisms for recognizing/correcting errors in one memory cell, the invention now allows the whole memory to be backed up. This allows the redundancy concept used to be expanded from the read-only memory to the data store too. This allows a further reduction in the manufacturing costs while retaining the existing safety requirements.

Further preferred embodiments can be found in the following description of an exemplary embodiment with reference to one FIGURE.

BRIEF DESCRIPTION OF THE DRAWING

In the drawing:
FIG. 1 shows a two-core integrated microcontroller with a data store and an additional test memory.

DETAILED DESCRIPTION OF THE DRAWING

The microcontroller in FIG. 1 comprises two central processing units (CPU) 1, 2 which operate in clock synchronism. Both microcomputers execute the same program. Each unit has a respective separate associated address and data bus. The CPU 1 has a full data store 7 connected to it which is partly backed up using a test data store 51 on the second bus. In addition, the microprocessor system comprises a comparator 3 which is in the form of a hardware element and which is used to continually compare the queuing addresses and data on the two bus systems with one another. If there is no match, an error signal is produced. For the purpose of simplified illustration, the figures do not show the components which are usually present in microprocessor systems in more detail, such as input/output units, read-only memories etc. These components which are not shown are essentially based on the redundant-core microcontroller described in WO99/35543.

The test data store 51 on the second bus has a storage capacity which is reduced by the factor 8 in comparison with the memory 7. Store 51 is used to store test data which are generated by the hardware generator 6 practically at the same time during each write operation for data by the CPU 1 in the memory 7. Generating the test data without program-related means allows the write operation to be performed in principle without increased clock cycle consumption. In addition, the test data which have been generated already for store 51 are stored a second time in the physical memory module of memory 7 in other memory addresses 5. The codes used for the error correction and for the error recognition in this case can be identical or different so that the test data are either identical or different from one another.

Reading involves the memory 7 being addressed by the CPU 1 using the address decoder 8. During the read operation, the hardware unit 6 is active. The hardware unit 6 is used to check the data in line with the test data generation method (e.g. Hamming code) and possibly to correct them immediately. The bus drivers which a block 3 contains are used to provide the queuing data for CPU 1 and CPU 2 at the same time. During the read operation by CPU 1, store 51 is addressed by way of address decoder 9 in parallel to data reading of CPU 2. Store 51 likewise contains test data for error recognition which are particularly test sums of the data in memory 7. If the data and the test data do not match, an error is recognized too. Although error recognition also takes place on the second bus, it relates to data which are possibly corrected in the area of the first bus. This check is performed in the hardware comparator 4, which can likewise generate an error signal. The test data store 5 is arranged in physical proximity to the data store 7 so that the data can be corrected within a short time and hence such correction is still possible within the prescribed timing.

The invention claimed is:

1. A microprocessor system for controlling at least partly safety-critical processes, comprising:
    a first central processing unit and a second central processing unit integrated in a chip housing, the first and second central processing units being configured to operate in clock synchronism with each other;
    a first bus system associated with the first central processing unit and a second bus system associated with the second central processing unit;
    at least one full memory on the first bus system;
    a first test data store on the second bus system, the first test data store having a reduced storage compared to the full memory on the first bus system, the first test data store storing test data related to data in the memory on the first bus system;
    each of the first and second bus systems including components which allow data interchange and comparison of data between the two bus systems;
    a first hardware test data generator arranged on the first bus system, the first hardware test data generator being configured to check the data according to at least one test data generation method and further being configured to correct the data in response to at least one type of data error;
    a second hardware test data generator arranged on the second bus system, the second hardware test data generator being configured to check the data according to at least one test data generation method; and
    wherein at least part of the full memory on the first bus is additionally backed up by means of a second test data store on the first bus, the second test data store storing test data and being configured to check corrected data from the first hardware test data generator.

2. The microprocessor system as claimed in claim 1, wherein the full memory and the test data store on the first bus and the test data store on the second bus each have a dedicated address decoder.

3. The microprocessor system as claimed in claim 1, wherein the test data on the first bus is stored in the full memory of the first bus.

4. The microprocessor system as claimed in claim 3, wherein at least one comparison structure is implemented in hardware and is capable of comparing a queuing addresses on the address buses or the data queuing on the data buses with one another during each read or write operation and generating an error signal if the addresses or data differ.

5. The microprocessor system as claimed in claim 4, wherein a read cycle involves the data in the full memory being tested for errors using the test data store area associated with the full memory directly on the first bus prior to the comparison in the comparison structure.

6. The microprocessor system as claimed in claim 4, wherein a read cycle involves the data in the full memory being compared with test data associated with these data by a hardware test unit which is positioned particularly in, or in proximity to, the data memory area, and a hardware correction unit correcting the data using the test data in the event of an error.

7. The microprocessor system as claimed in claim 1, wherein the microprocessor system is provided in a controller for a motor vehicle system.

8. The microprocessor system as claimed in claim 7, wherein said controller for a motor vehicle system comprises a motor vehicle brake controller, a controller for chassis regulation, or a controller for safety systems.

\* \* \* \* \*